INVENTOR

Stephen W. Hobday

BY Hall, Pollock & Vande Sande

ATTORNEY

INVENTOR
Stephen W. Hobday

BY Hall, Pollock & Vande Sande

ATTORNEY

INVENTOR
Stephen W. Hobday
BY Hall, Pollock & Vande Sande
ATTORNEY

United States Patent Office 3,460,257
Patented Aug. 12, 1969

3,460,257
APPARATUS FOR GRAPHICAL ANALYSIS

Stephen W. Hobday, 219 Sycamore Road, Farnborough, Hants, England

Filed Apr. 24, 1967, Ser. No. 633,013
Int. Cl. G01c 21/20; G01b 3/14, 5/24
U.S. Cl. 33—1 3 Claims

ABSTRACT OF THE DISCLOSURE

The disclosure relates to apparatus for providing a numerical display of graphical information. Provision is made for a linearized output of non-linear data. The apparatus includes means for mounting and transporting the graphical data to be analyzed, movable cursors for determining the ordinate corresponding to any preselected abscissa, a cursor which effectively transfers the value of the ordinate to a linearizing curve, and a further cursor for determining the linearized value of the ordinate from the linearizing curve.

Background of the invention

In various scientific fields, it is frequently a problem to convert graphical information into digital form so as to provide suitable input data for a computer, electric typewriter, or a tape or card punch. The input information may be obtained from graphs, charts, drawings, photographs, films or maps. Ordinarily, the problem of obtaining the output digital data is made more difficult if the graphical information appears in a non-linear form. The apparatus of the present invention is designed to make it possible to obtain a digital output from graphical data and to obtain this in linear form even where the graphical information is recorded in non-linear form.

The apparatus comprises means for supporting and also for selectively transporting the record bearing the graphical trace. In addition, the apparatus comprises an X cursor which is movable manually along the trace so as to intersect the trace at any desired abscissa. The apparatus further includes a Y cursor which is movable in a direction at right angles to that of the X cursor, and this Y cursor not only establishes the value of the Y ordinate at the point of intersection of the X cursor with the trace being read, but also establishes a corresponding ordinate value upon a linearizing curve which is separately mounted upon the reader. The intersection of this Y cursor with the linearizing curve establishes a corresponding abscissa or F value on the linearizing curve which then provides the digital output signal representative of the graphical value then being read off of the trace.

Figure 1:
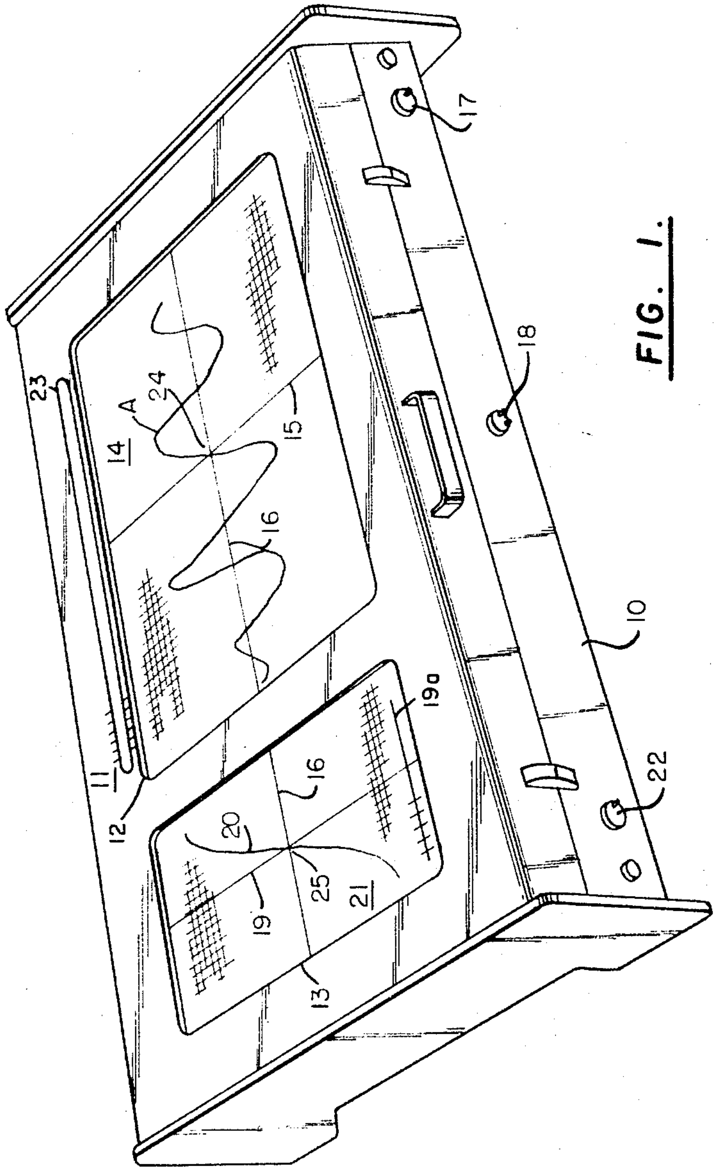
FIGURE 1 is a perspective view of one embodiment of the invention.

The embodiment of the invention illustrated in FIGURE 1 comprises a case 10 having a cover 11 defining therein a large rectangular aperture 12 and a smaller rectangular aperture 13. These apertures comprise "windows" in which may be supported flat sheets of paper tape, photographs, drawings, or the like bearing graphical data. The apparatus is arranged so that there appears in the window 12 record material 14 having thereon the graphical data which is to be analyzed by the apparatus, while iin window 13 there appears a correction curve.

A movable X cursor 15 and also a movable Y cursor 16 are adapted to be moved, respectively, in the horizontal and vertical direction over the graph on record 14. Movement of the cursor 15 may be effected by means of rotation of the control wheel 17, and movement of the Y cursor 16 may similarly be effected by rotation of knob 18.

As can be seen, the horizontal Y cursor 16 extends not only over the record 14 appearing in window 12 but also extends over the linearizing graph 21 appearing in window 13. In window 13 there also appears an additional F cursor 19 whose position may be adjusted by rotation of control knob 22.

In the use of the apparatus of FIGURE 1, the record 14 bearing the graph A which is to be analyzed is inserted in place in the window 12. The record may be in the form of a roll of tape which is fitted over a spindle (not shown) and fed therefrom to a take-up spindle and with the movement of the tape being governed by an external, manual control (not shown) on the case 10.

To use the apparatus of FIGURE 1, the X cursor 15 is moved to the desired abscissa value as determined by the scale of values appearing along the edge of the elongate slot 23. As shown in FIGURE 1, the intersection of the X cursor 15 with the graph A determines an intersection point 24. If next the horizontal cursor 16 is moved vertically so as to intersect the point of intersection 24, this establishes a point of intersection of the cursor 16 with the linearizing curve 20 at 25. The F cursor 19 is then moved horizontally to intersect the point 25, thereby giving a reading on the F scale **19*a* which is a linearized output of the value read by the horizontal Y cursor 16 in accordance with the correctional linearizing curve 20**.

It will be understood that the apparatus of the invention may employ, in addition to the usual visual scales for determining the positions of the several cursors, various potentiometers (not shown) each of which may be mechanically coupled to a respective cursor and arranged to provide an output signal representative of the position of that cursor.

Figure 2:
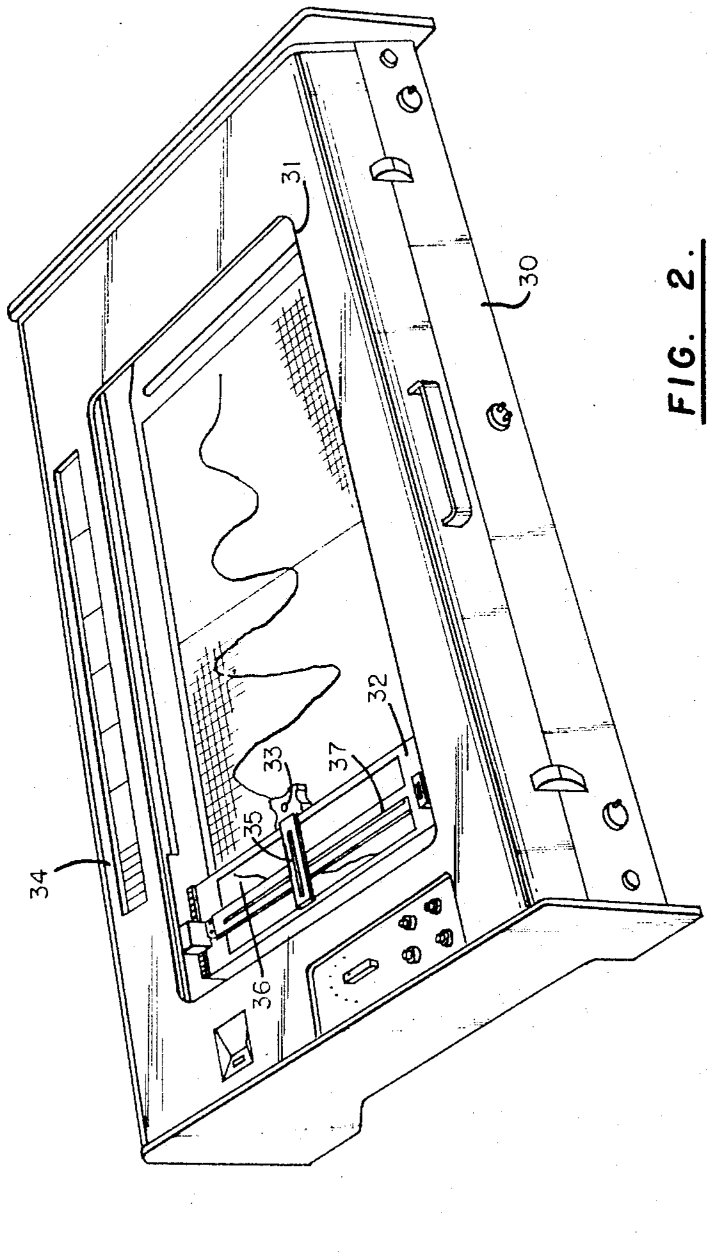
FIGURE 2 is a perspective view of an alternative embodiment of the invention.

In the alternative embodiment of the invention shown in FIGURE 2, the case 30 is provided with a single rectangular aperture or "window" 31 in which is positioned the graphical material to be analyzed. A carriage 32 is also provided, and this carriage is slidable horizontally upon a track (not shown) so that the sight 33 may be moved to any desired abscissa along the graph. In accordance with the position of the carriage, an X value corresponding to that position may be observed in the longitudinal aperture or slot 34 which includes scale markings so that a digital output representative of the X position of the carriage 32 may be noted. Once the carriage has been brought to the desired abscissa, the sight 33 may be moved up and down in the carriage to the desired value of the ordinate of the graph being analyzed. Movement of the sight in the vertical or Y direction establishes a particular intersection point of a slotted horizontal cursor 35 relative to a linearizing curve 36 affixed to the carriage 32. Subsequently, all that is required is for the operator to move the slotted vertical cursor 37 to the already established point of intersection of cursor 35 with the correction curve 36 in order to establish the linearized Y value of the reading along the F scale.

Figure 3:
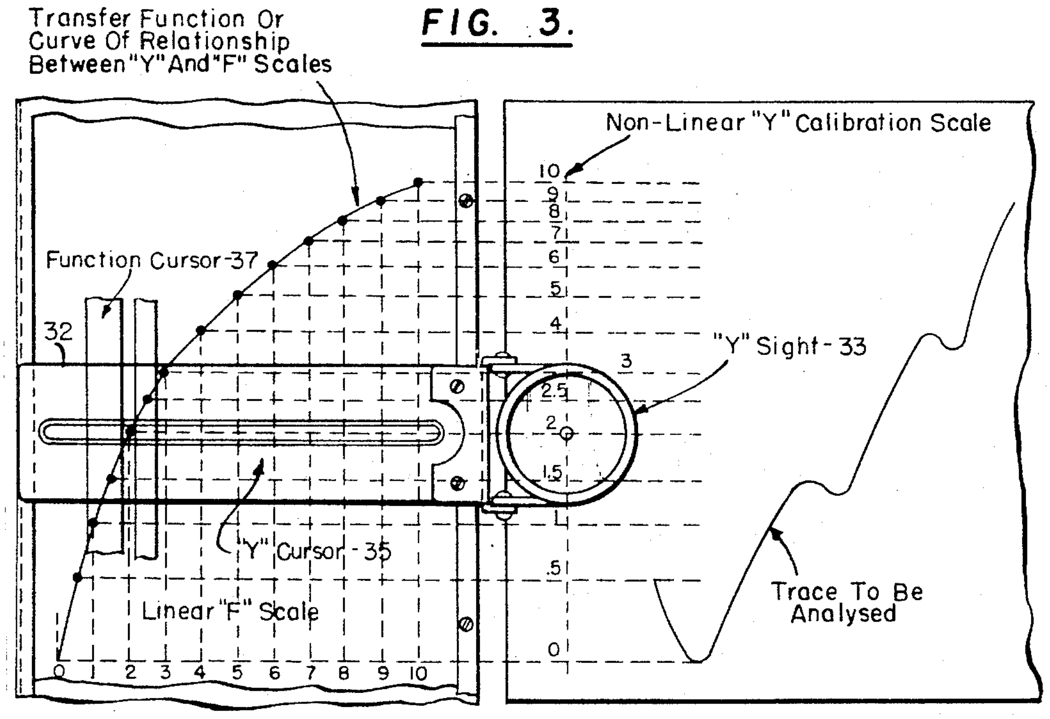
FIGURE 3 is a diagrammatic illustration which aids in illustrating the mode of operation of the invention.

This mode of operation is better illustrated in FIGURE 3. FIGURE 3 illustrates a trace to be analyzed and also illustrates the horizontally movable carriage 32 which supports the sight 33. When the carriage is moved in the horizontal direction to the desired abscissa of the trace, the Y cursor 35 is next moved vertically in a direction so that the curve appears directly under the Y sight 33. This immediately establishes a point of intersection of the Y cursor with the linearizing curve on the carriage and thereafter all that is required is to move the function cursor 37 so that it intersects the previously determined point of intersection of the Y cursor with the correction or linearizing curve. The point of intersection of the function cursor with the F scale determines the linearized output corresponding to the ordinate appearing for the selected abscissa value of the curve.

Having described two alternative embodiments of my invention, I wish it to be understood that various modifications and alterations may be made to the specific form shown without departing from the spirit or scope of my invention.

What I claim is:

1. Apparatus for analyzing graphical data comprising: means comprising a planar surface,
a first aperture in said planar surface for supporting a first record element bearing the graphical data to be analyzed,
a first cursor movable in one direction only over said first record,
means for indicating the position of said first cursor,
a second cursor movable in a direction transverse to said first cursor,
a second aperture in said planar surface for supporting adjacent said first record a second record bearing a correction curve,
said second cursor being visible in both said first and second apertures and overlying both said first and second record,
a third cursor overlying only said second record and movable over said second record in a direction transverse to said second cursor,
and means for indicating the position of said third cursor.

2. The apparatus of claim 1 in which said first cursor is a vertical cursor movable horizontally over said first record, said second cursor is a horizontal cursor which is movable vertically over said first and second record, and said third cursor is a vertical cursor movable horizontally over said second record.

3. Apparatus for analyzing graphical data comprising, means comprising a planar surface for supporting a first record bearing the graphical data to be analyzed, a carriage movable laterally over said first record, means for indicating the position of said carriage, a sight on said carriage movable in a direction perpendicular to the direction of movement of said carriage, means for supporting a second record bearing a correction curve upon said carriage, a cursor movable over said second record with said sight, a second cursor movable over said carriage in a direction perpendicular to said first cursor, and means for indicating the position of said second cursor.

References Cited

UNITED STATES PATENTS

| | | | |
|---|---|---|---|
| 2,494,077 | 1/1950 | Wilkinson | 33—80 X |
| 2,562,695 | 7/1951 | Brown | 33—80 X |
| 3,068,575 | 12/1962 | Fenske et al. | |

WILLIAM D. MARTIN, Jr., Primary Examiner

U.S. Cl. X.R.

33—80